April 28, 1970 C. VALSAMAKIS ET AL 3,509,317
INDIRECT RADIANT HEAT SOLDERING APPARATUS
Filed Aug. 1, 1967 2 Sheets-Sheet 1
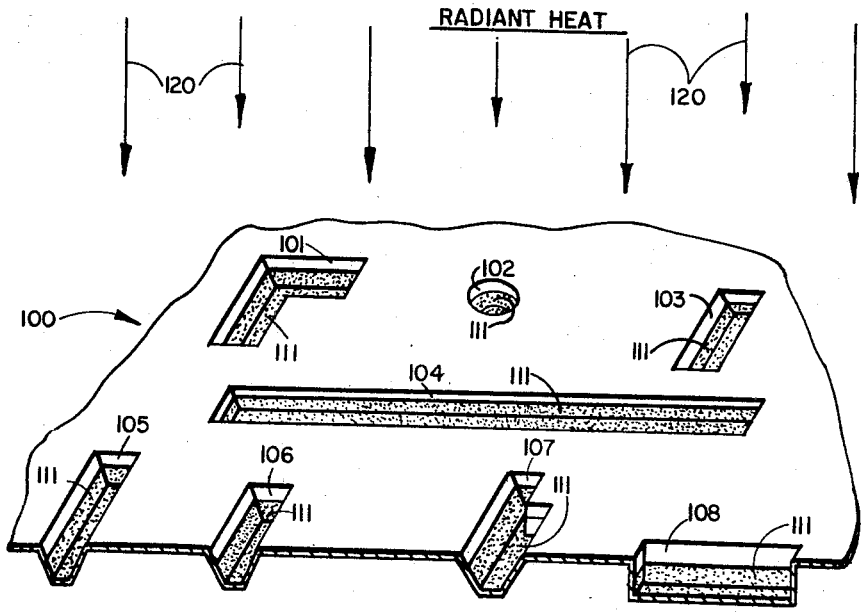
FIG. 1
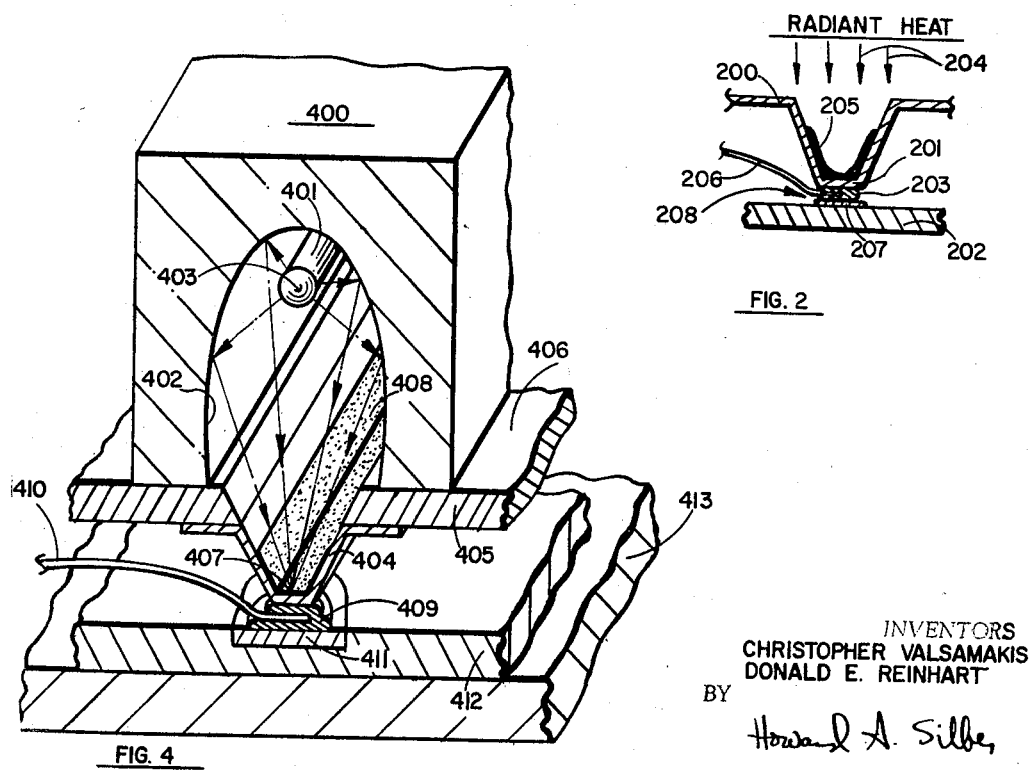
FIG. 2
FIG. 4
INVENTORS
CHRISTOPHER VALSAMAKIS
DONALD E. REINHART
BY
Howard A. Silber
ATTORNEY

INVENTORS
CHRISTOPHER VALSAMAKIS
DONALD E. REINHART

United States Patent Office 3,509,317
Patented Apr. 28, 1970

3,509,317
INDIRECT RADIANT HEAT SOLDERING APPARATUS
Christopher Valsamakis, Huntington Beach, and Donald E. Reinhart, Diamond Bar, Calif., assignors to North American Rockwell Corporation, a corporation of Delaware
Filed Aug. 1, 1967, Ser. No. 657,559
Int. Cl. H05b *1/00*
U.S. Cl. 219—258                                3 Claims

ABSTRACT OF THE DISCLOSURE

Apparatus for simultaneously soldering a plurality of circuit component leads to pads. Radiant heat is applied to heat exchange elements which are in pressure contact with, and conduct absorbed radiant heat to the component leads. The heat exchange element comprises a trough of heat conductive, non-solder adherent metal having an inner coating exhibiting high heat absorptivity.

BACKGROUND OF THE INVENTION

Field of the invention

The present invention relates to an apparatus and a process for indirect radiant heat soldering, and more specifically, to an apparatus for simultaneous soldering of a plurality of electrical component leads to pads by applying controlled radiant heat to heat exchange elements which make pressure contact with the leads.

Description of the prior art

With the advent of high density circuitry, there arose the problem of soldering a multiplicity of components to solder pads closely spaced on a single circuit board. Originally, technicans soldered each electrical joint individually with a soldering iron or a solder gun. From an economic standpoint, this was a costly procedure because of the time consuming efforts involved. Mass production of circuit boards required a faster, more economical means of soldering multiple circuit board leads.

A brute force approach to this problem was to utilize a plurality of conventional soldering tools adjacently mounted so as to contact simultaneously the joints to be soldered. Of course, this resulted in a bulky apparatus having little flexibility and wherein the soldering temperature was difficult to control.

A more satisfactory approach of the prior art was to solder a multiplicity of solder joints by simultaneously irradiating the joints with radiant heat. This was done by shining radiant heat through a window in a mask plate, thereby directing the heat onto the solder joints which were aligned beneath the window. The mask prevented heating of other parts of the circuit. However, this method of soldering did not ensure uniform heating of the solder joints because the emissivity invariably would differ from joint to joint.

Another disadvantage of this prior art radiant heating method was that controlled heating of the solder joints was not possible, often resulting in cold solder joints. Another serious shortcoming was that the leads to be soldered were not held securely in contact with the soldering pads.

The present invention provides an apparatus and method for simultaneously, indirect radiant heat soldering a plurality of solder joints. The invention overcomes many of the limitations of the prior art. In particular, the inventive apparatus is not bulky, permits uniform, controllable heating of all joints to be soldered, and functions to provide the desired pressure contact to hold the component lead in place while they are being soldered.

SUMMARY OF THE INVENTION

The invention which forms the subject matter of the present application comprises an apparatus and method for simultaneously indirect radiant heat soldering a plurality of component leads to solder pads.

In particular, the inventive apparatus comprises one or more troughs, formed of a heat conductive, non-solder adherent metal, and positioned to correspond with the location of the pads to be soldered. The troughs are supported by a mask plate which has windows permitting radiant heat to strike the inner surface of the troughs. The trough inner surfaces are coated with a material having high heat absorptivity.

To solder the joints, the uncoated outer surface of the trough is lowered into contact with the pre-tinned component leads. The weight of the apparatus holds the leads in place on the pads as radiant heat is shined through the mask plate windows onto the coated inner surfaces of the troughs. The radiant heat is absorbed by the coating and transmitted through the heat conductive troughs to the solder joint, causing the solder to flow.

The temperature of the joint, as well as the rates at which the temperature is increased and decreased may be controlled by controlling the duration and amount of radiant heat applied. This permits, for example, controlled cooling of the solder, thereby preventing cold solder joints.

It is thus an object of the present invention to provide an improved soldering method and apparatus.

It is another object of the present invention to provide an apparatus and method for simultaneously soldering a plurality of joints using indirect radiant heating.

Another object of the present invention is to provide a soldering apparatus in which radiant heat is absorbed by an element and transmitted by the element to the workpiece.

Still another object of the present invention is to provide an indirect heat soldering apparatus comprising at least one heat exchange trough for absorbing radiant energy and for conducting this energy to a component lead to be soldered.

A further object of the present invention is to provide an indirect radiant heat soldering apparatus adapted to hold in place during soldering the items being soldered.

These and other objects and features of the invention will become more apparent in conjunction with the following description and drawings which are utilized for illustrative purposes only.

BRIEF DESCRIPTION OF THE DRAWINGS

FIG. 1 is a simplified perspective view, in partial section, illustrating the basic heat exchange element useful for indirect radiant heat soldering in accordance with the present invention.

FIG. 2 is a sectional view showing a typical heat exchange element of the type shown in FIG. 1. The element is in contact with a component lead being soldered to a pad.

FIG. 4 is a perspective view, in partial section, illustrating a preferred apparatus for radiant heat illumination of the inventive soldering apparatus.

DESCRIPTION OF THE PREFERRED EMBODIMENT

Figure 3:
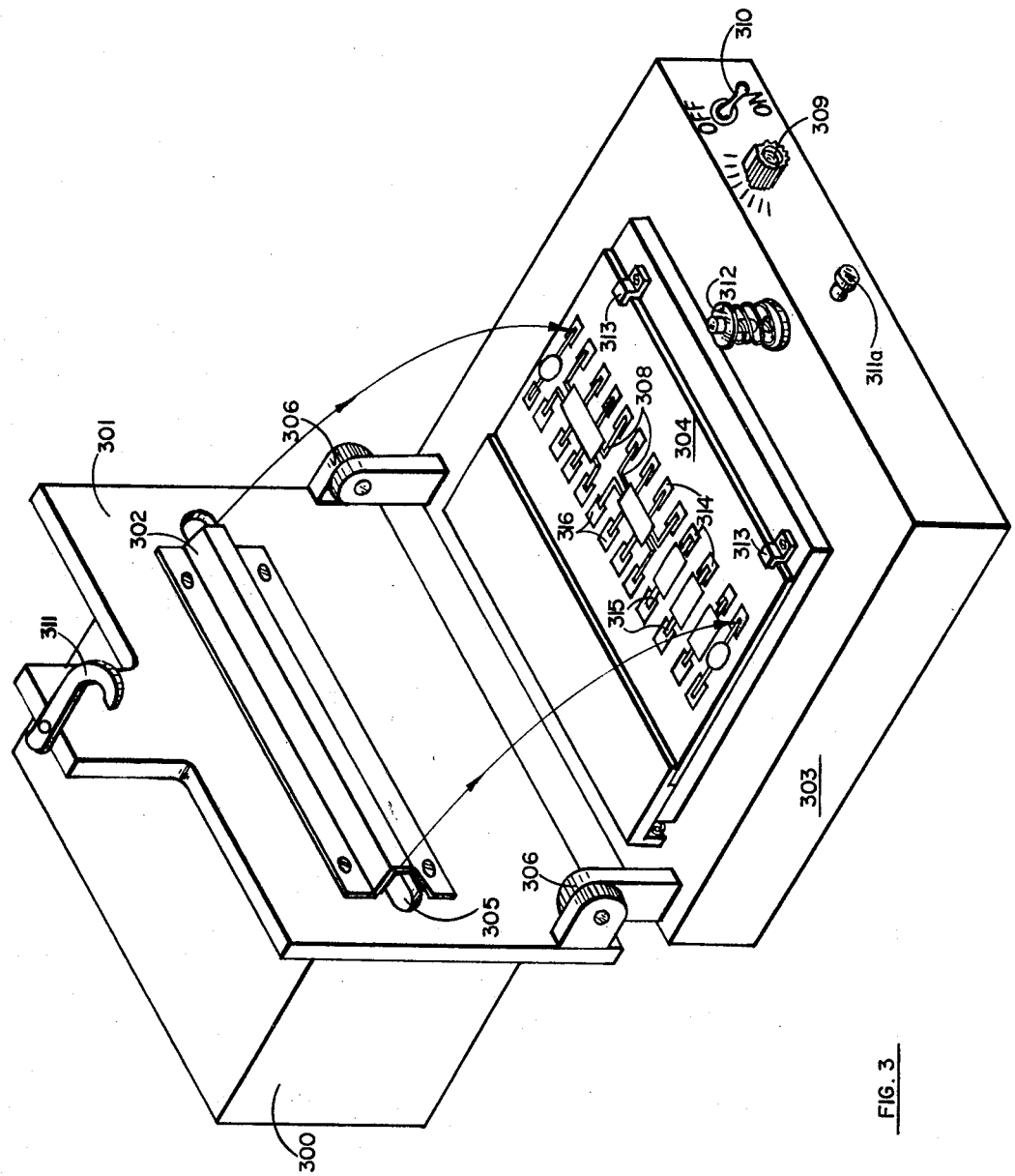
FIG. 3 is a perspective view of a complete indirect heat soldering apparatus in accordance with the present invention. Also shown is a typical printed circuit board positioned to accomplish simultaneous soldering to a plurality of its pads using the inventive apparatus.

In accordance with the present invention, FIG. 1 shows an apparatus for simultaneously soldering a plurality of joints on a workpiece, the apparatus comprising a layer of heat conducting material 100 with trough-shaped pressed areas 101–108. The configuration of the various troughs 101–108 is dictated by the arrangement on the workpiece of the joints to be soldered. For example, a long row of joints may be soldered using an elongate trough 104, while a single solder joint may require a small trough 102.

The inner surface of each of troughs 101–108 is coated with a heat absorbing material 111, preferably having an absorptivity of at least 0.9 to insure good absorption of radiant heat 120 directed onto the troughs 101–108. An example of such a heat absorbing material is PT 404 Hi-Heat coating made by Process Techniques, Incorporated. Coating 111 also should be able to withstand high temperatures. The non-depressed areas of layer 100 serve the function of masking the other areas of the workpiece from radiant heat 120.

FIG. 2 shows in cross-section a typical trough 201 used in accordance with the present invention to solder a wire, such as component lead 206, to pad 207. This view is typical of a cross-section through any of troughs 101–108 shown in FIG. 1. The bottom side of trough 201 is in pressure contact with the workpiece 202 at the solder joint 208. Radiant heat 204 is directed onto and absorbed by the heat absorbing coating 205, and conducted through the thickness of the trough 201 and onto the solder joint 208. Pressure contact secures the component lead 206 to the soldering pad 207 during the soldering process. The component lead 206 is usually pretinned with solder 203 to facilitate soldering. Member 200 prevents radiant heat 204 from impinging directly on workpiece 202.

The particular source of radiant heat 204 is not critical. Various heat sources may be used, including an infrared lamp or a white light lamp. While it would be economically desirable to focus all of the radiant heat from such a source onto the trough 201, such focusing is not necessary. The only requirement is that there be sufficient radiant heat impinging on the trough 201 to cause the solder 203 to flow. Since the absorbed radiant heat 204 must be conducted through the thickness of the trough 201 in order to reach the solder joint 208, it is advantageous to use a good heat conducting material for the trough 201. At the same time, solder 203 should not adhere to trough 201. An appropriate material for the trough 201, therefore, is stainless steel. This, however, does not exclude other materials which meet the requirement of heat conductivity and non-solder adherency.

The advantages of indirect heat soldering utilizing the present invention wherein radiant heat is converted to conductive heat, rather than being applied directly to the solder joints, are twofold. First, it insures uniform heating of all solder joints because the troughs heat all the joints to the same temperature; second, the pressure provided by the troughs furnishes a convenient means of securing the wire in place on the pad during soldering.

A preferred embodiment of the invention is shown in FIGS. 3 and 4.

Referring to FIG. 3 the illustrated embodiment of the inventive apparatus comprises a radiant heat source housing unit 300, a mask plate 301, a heat conducting trough 302, and a base 303. A workpiece 304 is shown fixed in position on the base 303 by clamps 313, so that the trough 302, when lowered into the soldering position, mates with component leads 308 which are to be soldered to pads 314. The arrangement of component leads 308 suggests the use of a single elongate trough 302 in the soldering apparatus. Of course, workpieces having other component lead configurations would suggest the use of differently shaped troughs.

Component leads 315 may be soldered to pads 316 by repositioning the workpiece 304 such that the trough 302, when lowered into the soldering position, mates with component leads 315. Alternatively, component leads 308 and 315 may be soldered simultaneously to pads 314 and 316 respectively by replacing trough 302 with a pair of parallel elongate troughs, which troughs may be irradiated through a single window or a pair of aparallel windows.

Mask plate 301, used to shield the workpiece 304 from radiant heat, is fastened to the housing unit 300. The mask plate 301 has a window 305 cutout to allow the radiant heat to pass through to the trough 302. Trough 302 is fastened to the mask plate 301 so that the absorptive coating on the inner surface of trough 302 is directly beneath the window 305. The reason for using a separate mask plate 301 and trough 302, is that such a configuration is easier to manufacture than is the unitary layer 100 shown in FIG. 1.

Still referring to FIG. 3, the upper assembly, comprising the housing unit 300, the mask plate 301, and the trough 302, is connected to the base 303 by hinges 306. The latch 311, when hooked over pin 311a, fixes the upper assembly in position during the soldering process. The spring 312 relieves excess pressure which the weight of the upper assembly may exert on the workpiece.

Mounted on the base 303 is switch 310 which turns on a power supply (not shown) which may be required to furnish power to the radiant heat source within the housing unit 300. Also mounted on the base 303 is a control 309 for a timer, of a type well known to those skilled in the art, which controls the length of time that the radiant heat source is turned on. This in turn determines the heating time, and, therefore, the temperature of the workpiece. One method of controlling the period of operation is to determine how long the radiant heat source must be turned on in order for the trough 302 to reach the required temperature for the solder to flow. Control 309 then is set accordingly so that the radiant heat source is only on for the preselected period of time.

Another, and perhaps more desirable method of controlling the time of operation of the inventive soldering apparatus is to have a thermocouple connected to the trough 302 such that when its temperature is high enough to cause the solder to flow, the radiant heat source will be turned off. Since the mass of the trough 302 is relatively small, it is possible to control the rate of increase or decrease in temperature of the trough 302 by appropriately increasing or decreasing the energy to the radiant heat source.

FIG. 4 shows a perspective view in partial section of of an embodiment of the inventive apparatus such as that shown in FIG. 3, but arranged in operating position. The housing unit 400 comprises a cylindrical lamp 401 and an inner reflective surface 402 represented by the right angle projection of a truncated ellipse, where the focal point one 403 and the intersection of the major and minor axes are within the truncated ellipse. The longitudinal axis of the lamp is coincident with the right angle projection of focal point one 403. The trough 404 is mechanically connected to the mask plate 405 directly beneath, and aligned with, the window. The housing unit 400 is positioned on the mask plate 405 such that the ellipse is truncated perpendicular to its major axis by the upper surface 406 of the mask plate 405, and such that the right angle projection of focal point two 407 is coincident with that part of the coated surface 408 of the trough 404 which faces the window.

By virtue of the nature of an ellipse, rays emanating from one focal point of an ellipse, when reflected by the inner boundary of the ellipse, are focused onto the other focal point. Therefore, by placing the absorbing surface 408 of the trough 404 at the focal point two 407, the heat from the lamp 401 is reflected by the inner surface 402 of the housing unit 400 onto the trough 404. The heat is then conducted through the thickness of the trough 404 and onto the solder joint 409. Joint 409 comprises the component lead 410 and the solder pad 411 on the workpiece 412, said workpiece 412 being positioned on the base 413.

Of course, the invention is not limited to the use of an elliptically reflective surface 402. A spherically reflective surface would suffice, as would no reflector at all. There need only be sufficient radiant heat impinging upon the trough 404 to cause the solder to flow. However, the elliptically reflective surface affords the opportunity of using a lamp of lower energy than may otherwise be required.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. An indirect radiant heat soldering apparatus comprising:
   a base;
   an assembly hinged to said base, said assembly comprising:
   a housing unit;
   a mask plate having a window, said plate forming the lower boundary of said housing unit;
   a heat conducting, non-solder adherent trough connected to the bottom of said plate, the inner surface of said trough facing said window, said inner surface coated with a high heat absorptivity material;
   a reflective interior represented by a right angle projection of a truncated ellipse, said mask plate defining a plane truncating said ellipse perpendicular to the major axis of the ellipse at a point between focal point two and the intersection of the major and minor axes, focal point two being outside the truncated ellipse and coplanar with said coating;
   a means for mounting a lamp within the said housing unit whereby radiation from said lamp will pass through said window and impinge on said coated surface of said trough; and
   means for engaging a workpiece whereby the portions of said workpiece are positionally aligned with said trough.

2. The combination defined in claim 1 wherein said lamp is cylindrical, and wherein said means for mounting is adapted to support said lamp with the longitudinal axis of said lamp coincident with the right angle projection of focal point one of said ellipse.

3. The combination defined in claim 2 wherein the longitudinal axis of said window is parallel to the longitudinal axis of said lamp.

References Cited

UNITED STATES PATENTS

| | | | |
|---|---|---|---|
| 1,954,128 | 4/1935 | Heyroth et al. | 219—461 |
| 3,079,913 | 3/1963 | Nelson. | |
| 3,098,922 | 7/1963 | Paxton | 219—258 X |
| 3,172,999 | 3/1965 | Sutton et al. | 219—524 |
| 3,283,124 | 11/1866 | Kawecki | 219—347 |
| 3,374,531 | 3/1968 | Bruce. | |

FOREIGN PATENTS 752,400  6/1953  Germany.

ANTHONY BARTIS, Primary Examiner

M. C. FLIESLER, Assistant Examiner

U.S. Cl. X.R.

219—354, 524, 228, 347